United States Patent
Kunde et al.

[11] Patent Number: 6,031,083
[45] Date of Patent: Feb. 29, 2000

[54] DISAZO DYESTUFFS

[75] Inventors: Klaus Kunde, Neunkirchen-Seelscheid; Wolfgang Zarges, Köln, both of Germany

[73] Assignee: Bayer Aktiengesellschaft, Leverkusen, Germany

[21] Appl. No.: 09/272,881

[22] Filed: Mar. 19, 1999

[30] Foreign Application Priority Data

Oct. 7, 1998 [DE] Germany .......................... 198 46 098

[51] Int. Cl.$^7$ .......................... C09B 35/037; C09B 43/00; D06P 1/39
[52] U.S. Cl. .............................. 534/728; 534/887; 8/527; 8/681; 8/919
[58] Field of Search .................. 534/728, 887; 8/527

[56] References Cited

U.S. PATENT DOCUMENTS

| | | | |
|---|---|---|---|
| 4,808,192 | 2/1989 | Narita et al. | 8/527 |
| 4,988,805 | 1/1991 | Kunde | 534/728 X |
| 5,288,294 | 2/1994 | Kaser | 8/687 |
| 5,565,102 | 10/1996 | Brandt et al. | 210/500.28 |
| 5,808,016 | 9/1998 | Kunde | 534/819 |

*Primary Examiner*—Fiona T. Powers
*Attorney, Agent, or Firm*—Joseph C. Gil; Richard E.L. Henderson

[57] ABSTRACT

The new disazo dyestuffs of the formula (I)

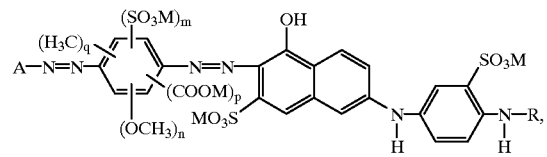

(I)

wherein the substituents and the indices have the meanings given in the description,
wherein more than 25 equivalent % of all the M cations in the molecule are alcohol ammonium radicals of the formula $^{\oplus}NR_1R_2R_3R_4$ wherein
$R_1$, $R_2$, $R_3$ and $R_4$ independently of one another represent hydrogen, $C_1$–$C_4$-alkyl and $C_2$–$C_4$-hydroxyalkyl, with the proviso that at least one of the radicals $R_1$–$R_4$ denotes $C_2$–$C_4$-hydroxyalkyl,
are excellently suitable for dyeing cellulose-containing materials, and in particular paper, and are distinguished by high degrees of fastness.

17 Claims, No Drawings

DISAZO DYESTUFFS

The present invention relates to new disazo dyestuffs, to processes for their production and to their use for dyeing cellulose-containing materials.

The new disazo dyestuffs correspond to the general formula (I)

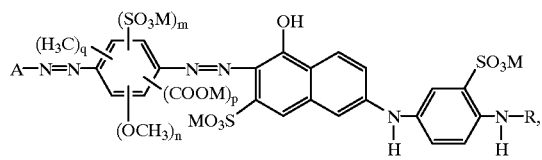

(I)

wherein
A represents a radical of the formula

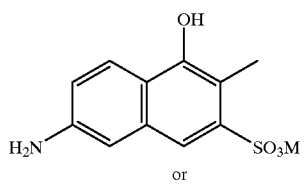

(II)

or

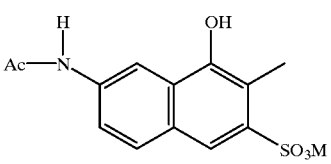

(III)

wherein
Ac represents an acetyl or propionyl radical or a benzoyl radical optionally substituted by $CH_3$, $CH_3O$ or COOM
m, n, p and q represent 0 or 1 and
m+p=1,
R represents hydrogen or a benzoyl radical optionally substituted by $CH_3$, $CH_3O$ or COOM,
wherein
more than 25 equivalent % of all the M cations in the molecule are alkanol ammonium radicals of the formula $^\oplus NR_1R_2R_3R_4$, wherein
$R_1$, $R_2$, $R_3$ and $R_4$ independently of one another represent hydrogen, $C_1$–$C_4$-alkyl and $C_2$–$C_4$-hydroxyalkyl,
with the proviso that R is not hydrogen if m=1 and n=0 and q=0.

In the context of the present application equivalent % refers to the proportion of the total quantity of M cations in compound (I).

Preferably at least one of the radicals $R_1$–$R_4$ denotes $C_2$–$C_4$-hydroxyalkyl.

Particularly preferably more than 50, and in particular more than 60 equivalent %, of all the M cations consist of alkanol ammonium.

The remaining cation contents preferably consist of $Na^\oplus$, $K^\oplus$ or $Li^\oplus$.

Most preferably more than 75 equivalent % of the M cations consist of alkanol ammonium.

Preferred alkanol ammonium salts which may be mentioned are:

$H_3^\oplus NCH_2CH_2OH$, $H_2^\oplus N(CH_2CH_2OH)_2$, $H^\oplus N(CH_2CH_2OH)_3$, $^\oplus N(CH_2CH_2OH)_4$, $H^\oplus N(CH_3)(CH_2CH_2OH)_2$, $H^\oplus N(CH_3)_2(CH_2CH_2OH)$, and $H^+N(C_2H_5)(CH_2CH_2OH)_2$.

The most preferred alkanol ammonium cation is $H^\oplus N(CH_3)(CH_2CH_2OH)_2$.

Preferred dyestuffs of the formula (I) are those in which A represents a radical of the formula

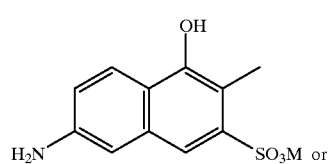

(II)

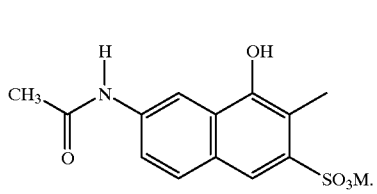

(VII)

Particularly preferred dyestuffs in the context of formula (I) are those of the formulae

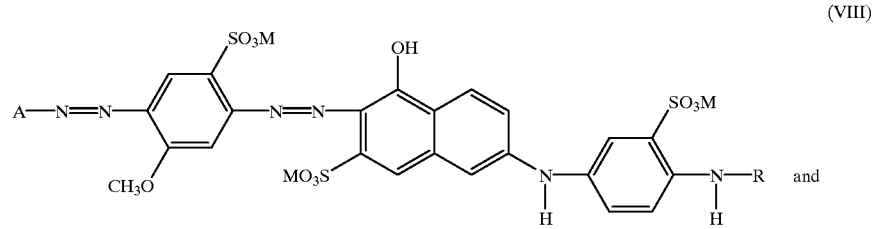

(VIII)

and

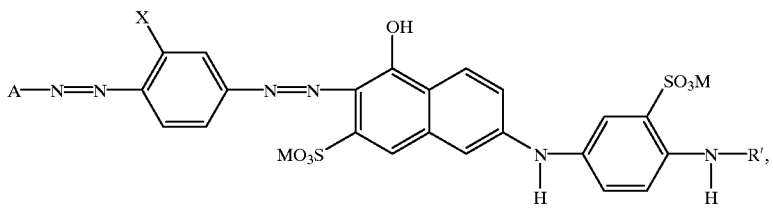

wherein
A represents a radical of the formula (II) or (VII) and
X represents $SO_3M$ or COOM, and preferably COOM,
R' represents hydrogen or a benzoyl radical optionally substituted by $CH_3$, $CH_3O$ or COOM,
and
R and M have the abovementioned meanings.

Of particular interest are dyestuffs of the formulae (VIII) and (IX), wherein
A represents a radical of the formula (II) or (VII),
X represents $SO_3M$ or COOM and
R represents hydrogen or $COC_6H_5$.

The invention also relates to a process for the preparation of the compounds of the formula (I) according to the invention, characterized in that compounds of the formula (I), in which M represents $Na^\oplus$, $Li^\oplus$ and/or $K^\oplus$, are membrane-filtered in the form of aqueous solutions or suspensions of the aforesaid compounds, in the presence of ammonium salts of the formula $^\oplus NR_1R_2R_3R_4$, $An^\ominus$, in which $R_1$ to $R_4$ have the abovementioned meanings and $An^\ominus$ represents an inorganic anion.

The membrane filtration process can comprise concentration or diafiltration.

Appropriately a procedure is preferably employed in which the synthesis solution containing the Li, Na or K salt (or mixed salts) of the dyestuff of the formula (I) is first of all desalted by means of diafiltration, i.e. the continuous replacement of permeate by demineralized water, and an excess of the required ammonium salt is then added to the solution, or this salt is produced in situ in the dyestuff solution by the addition of amine and acid, followed by further desalination. Depending on the membrane selectivity for the cations and anions present, the addition of the ammonium salt and subsequent desalination can be repeated.

Another possibility consists in continuing the initial desalination but replacing the permeate by an ammonium salt solution instead of demineralized water.

In general at least a fivefold molar excess, and preferably at least a tenfold molar excess of the ammonium salt (based on the dyestuff) is used in this resalting process.

In order to ensure sufficient dyestuff retention, nano- and ultrafiltration membranes are the preferred polymer membranes for the process.

The active separating layer can for example consist of polyamide, polysulphone, polyether sulphone or polyaramide. Preferred suitable membranes are also polymer membranes of the kind disclosed for example in EP-A 652 044.

The membranes employed preferably have cut-off values of MWCO 200 to 15,000 daltons, preferably 300 to 5,000 daltons.

The process according to the invention is carried out preferably at a temperature of 40 to 80, and in particular 50° to 70° C.

The sodium salts of the dyestuffs of the formula (I) which are employed have already been disclosed in DE-A 19 638 890 or can be prepared analogously thereto.

The invention relates to an additional process for the preparation of the dyestuffs according to the invention, characterized in that compounds of the formula (I), wherein M represents hydrogen, are reacted with amines of the formula $NR^1R^2R^3$. wherein $R^1$ to $R^3$ have the abovementioned meanings.

The acid form of the compound of the formula (I) can for example be prepared from the Na salt preferably obtained during the synthesis by acidification with an inorganic acid, preferably HCl.

The preparation of the ammonium salts of the formula (I) according to the invention by the above process is carried out preferably at a temperature of 10 to 50° C.

It may be advantageous to isolate the dyestuff of the formula (I) from the synthesis solution or suspension in the form of an alkali metal salt, in order to remove the major portion of the salt content, and to dissolve the dyestuff in demineralized water.

For this purpose it is particularly advantageous to reduce the pH value of the synthesis solution or suspension to $\leq 2$ by the addition of an acid, preferably a mineral acid, such as sulphuric acid or in particular hydrochloric acid, and to isolate the precipitated dyestuff. Some of the alkali metal cations are replaced by protons in the dye-stuffs isolated in this way.

If a dyestuff paste with an alkali metal cation portion of less than 25% is prepared in the above way a concentrated aqueous solution can be obtained directly by adding the quantity of amine or ammonium hydroxide necessary for neutralization.

The dyestuffs according to the invention dye cellulose-containing materials, and in particular paper, cotton and viscose as well as leather, in blue shades with high fastness to wet treatment and light.

The dyestuffs can be used according to all processes commonly used for substantive dyes in the paper and textile industry, and in particular in stock dyeing, such as in the surface dyeing of paper for sized and non-sized grades, starting from bleached or non-bleached cellulose of various origins, such as softwood or hardwood sulphite and/or sulphate cellulose. They can also be used in the dyeing of yarn or piece goods of cotton, viscose and linen by the exhaust process from a long liquor or in continuous processes.

The dyeings on paper obtained with the dyestuffs according to the invention are distinguished by high fastness to light and wet treatment (fastness to bleeding) and fastness to acids, alkalis and alum. The brilliance and clarity of the colour shades is also notable. The combination properties with suitable dyestuffs are also very good.

For the stock dyeing of paper the dyestuffs can be added to the paper pulp before sheet formation, either to the thick stock after breaking down the cellulose or to the thin stock before feeding to the papermaking machine. For the preparation of paper sized in the pulp they are preferably added to the thin stock before the addition of the sizing agent.

In surface dyeing the dyestuff is applied after sheet formation. This is carried out preferably in the size press, by dissolving the dyestuff in a concentrated starch solution and applying it in this form to the paper.

The dyestuffs of the formula (I) can be used as solid dyestuff preparations, preferably in the form of powders or granules, which optionally contain common additives such as for example ionic or non-ionic formulating agents and/or dedusting agents.

The use of liquid preparations, and in particular the use of concentrated aqueous solutions which are preferably free from organic solubilizing agents and contain at least one dyestuff of the general formula (I) are preferred for the process according to the invention. The liquid dyestuff preparations generally contain 10 to 60% by weight, preferably 10 to 40% by weight, of at least one dyestuff of the formula (I), based on the finished preparation.

EXAMPLES

Example 1 a) 284 g of 5-amino-4-methoxy-2-nitrobenzenesulphonic acid are diazotized in 3,000 ml of water at a pH value of 1.5 and a temperature of 30° C. 281 g of 6-acetylamino-4-hydroxy-2-naphthalenesulphonic acid are added to this suspension. The pH value of the suspension is brought to and maintained at 3 with soda solution. When the coupling has ended 250 g of technical grade (60%) sodium sulphide are added at a temperature of 60° C. When the reduction has ended the aminoazo compound is precipitated by the addition of salt and isolated.

310 g of this aminoazo compound are diazotized in 2,500 ml of water at a pH value of 1.5 and a temperature of 30° C. This diazonium compound is added dropwise at a temperature of 25° C. to a solution of 200 g of 4-hydroxy-7-(4'-amino-3'-sulphophenylamino)-2-naphthalene sulphonic acid in 1500 of water, the pH value being maintained at 7 using soda solution. When the coupling has ended the pH value of the dyestuff suspension is brought to 1.5 by adding hydrochloric acid. The precipitated dyestuff is isolated. It corresponds to the following formula b) 4,000 g of paste with a content of 33% of the dyestuff prepared as described under a) are introduced into 26 g of demineralized water at 50° C. By adding 1,340 ml of (10%) lithium hydroxide solution a solution is obtained at 50° C. and a pH of 10.5 which is subsequently desalted using a membrane of the spiral wound module type, which has a polyamide separating layer, a cut-off value of 3,500 daltons and a $T_{max}$ of 50° C.

The saturated solution of the Li/Na mixed salt has an extinction coefficient of 26 at 50° C. and a chloride concentration of 0.2% (1 cm layer thickness, 1% solution in water, wavelength: 630 nm).

c) 35 kg of a paste of the dyestuff according to Example 1a are introduced into 95 kg of demineralized water at 70° C. After adding 14 l of (10%) lithium hydroxide solution a solution is obtained at 70° C. and a pH of 10.5 which is then desalted with 'high-temperature'-stable polymer membranes in a spiral wound module. The saturated solution of the Li/Na mixed salt has an extinction coefficient of 51 at 70° C. and a chloride concentration of 0.4% (1 cm layer thickness, 1% solution in water, wavelength: 630 nm).

Example 2

Preparation of a solution of the Na,Li,N-methyldiethanolammonium dyestuff salt which is stable in storage The solution prepared in Example 1c is initially desalted via diafiltration at 70° C. and a module inlet pressure of 20 bars (diafiltration 1.5 times using demineralized water). A nanofiltration membrane (polyether sulphone; MWCO: 400 daltons; $T_{max}$:80°) is used in the form of a 4" spiral wound module with 44 mil parallel spacers. 18 kg of N-methyldiethanolamine are then added to the retentate. By adding 9.5 liters of (37%) hydrochloric acid a pH of 7.5 is then adjusted. This is followed by double diafiltration. The content of alkanol ammonium cations is now approx. 55 equivalent % and can be increased even further by further processing. A pH of 7.5 is again adjusted with 7.6 liters of hydrochloric acid (37%). Finally double diafiltration and concentration are carried out. The resulting retentate is adjusted to an extinction coefficient of 76.2 by diluting with water (1 cm layer thickness, 1% solution in water, wavelength: 630 nm). The dyestuff solution has high stability in storage. In order to provide protection against bacterial contamination conventional preservatives can be added.

The content of alkanol ammonium cations is approximately 85 equivalent %.

Using the dyestuffs listed in the following table concentrated dyestuff solutions which are stable in storage are also obtained by the process described in Example 2 using the alkanolamines mentioned.

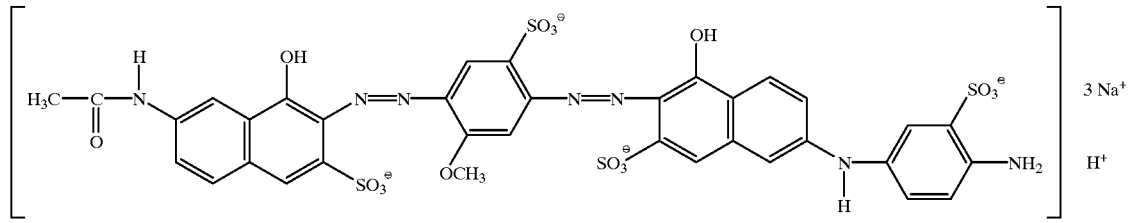

| Example | Dyestuff | Amine |
|---|---|---|
| 4 | [trisazo dye structure with OH, $H_2N$, $SO_3^\ominus$, $COO^\ominus$, benzamide groups; 2 $Na^+$, 2 $H^+$] | $N(C_2H_4OH)_3$ |
| 5 | [trisazo dye structure with OH, $SO_3^\ominus$, $OCH_3$, $NHCOCH_3$, benzamide groups; 3.5 $Na^+$, 0.5 $H^+$] | $H_3CN(C_2H_4OH)_2$ |
| 6 | [trisazo dye structure with OH, $H_2N$, $SO_3^\ominus$, $OCH_3$, $NH_2$ groups; 3 $Na^+$, 1 $H^+$] | $HN(C_2H_4OH)_2$ |
| 7 | [trisazo dye structure with OH, $H_2N$, $SO_3^\ominus$, $OCH_3$, benzamide groups; 2.5 $Na^+$, 1.5 $H^+$] | $N(C_2H_4OH)_3$ |

-continued
| Example | Dyestuff | Amine |
|---|---|---|
| 8 | 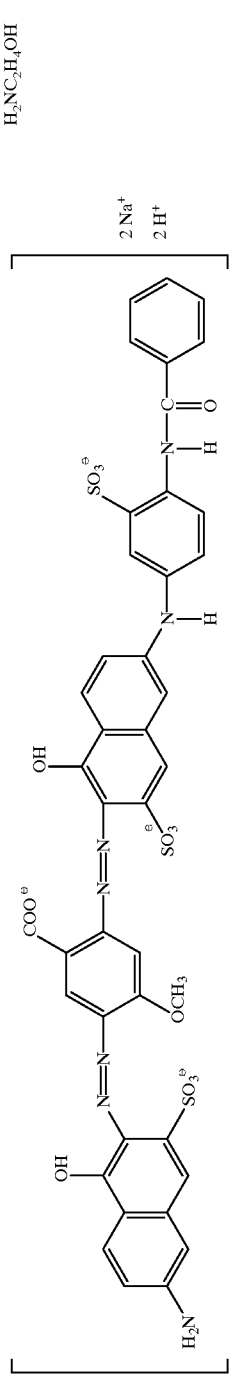 | $H_2NC_2H_4OH$ |
| 9 | 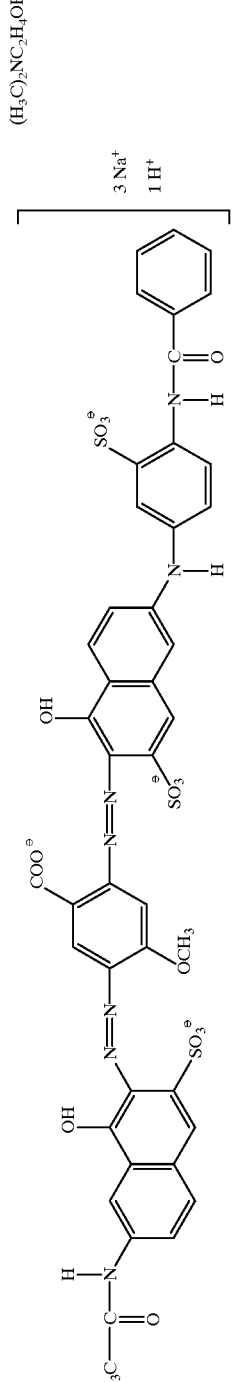 | $(H_3C)_2NC_2H_4OH$ |
| 10 | 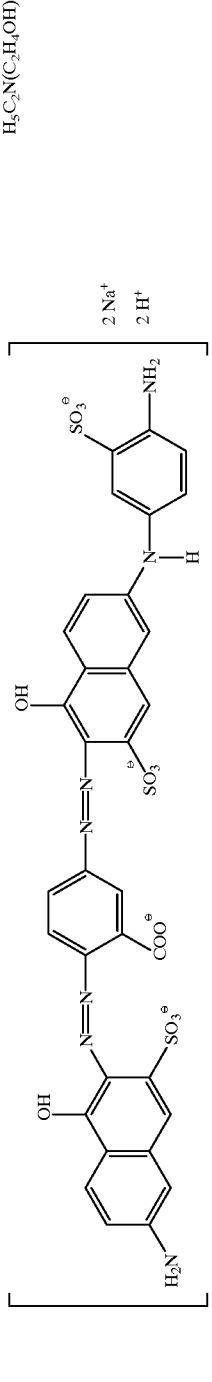 | $H_5C_2N(C_2H_4OH)_2$ |

Example 11

The filter cake obtained after isolation in Example 1 a) is washed five times on the filter with 1,000 ml of 2% hydrochloric acid each time. After the final washing the dyestuff corresponds to the formula

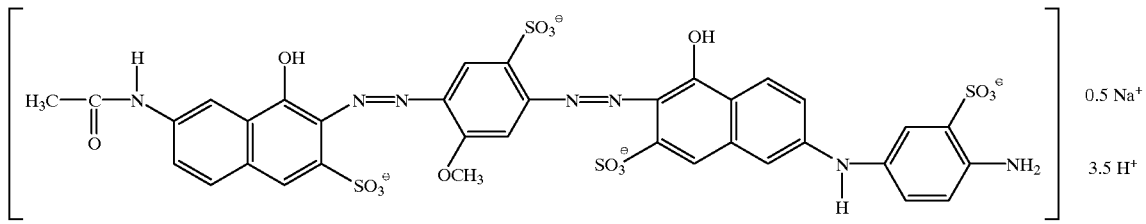

100 g of this paste having a dyestuff content of 30% are dissolved at 50° C. in a mixture of 100 ml of demineralized water and 45 g of N-methyldiethanolamine. By adding demineralized water an extinction coefficient of 76.2 (1 cm layer thickness; 1% solution in water; wavelength: 630 nm) is adjusted. The dyestuff solution has good stability in storage.

What is claimed is:

1. A dyestuff having the formula (VIII)

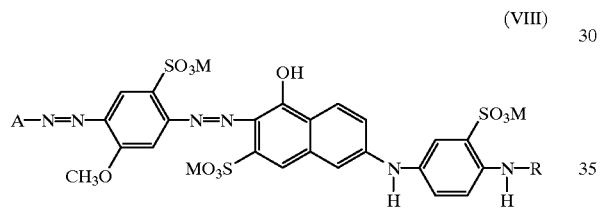

wherein

A represents a radical of the formula (VII)

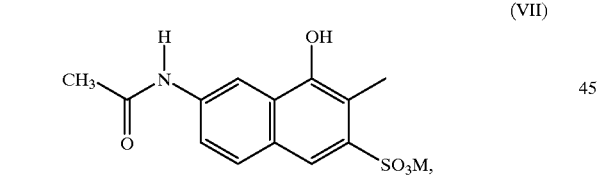

R represents hydrogen, and

M represents one or more cations, wherein more than 25 equivalent % of said cations M are ammonium radicals of the formula $^+NR_1R_2R_3R_4$ wherein $R_1$, $R_2$, $R_3$, and $R_4$ independently of one another represent hydrogen, $C_1$—$C_4$ alkyl, or $C_2$—$C_4$ hydroxyalkyl.

2. A dyestuff according to claim 1 wherein at least one of $R_1$, $R_2$, $R_3$, and $R_4$ denotes $C_2$–$C_4$ hydroxyalkyl.

3. A dyestuff according to claim 1 wherein the ammonium radical is selected from the group consisting of $H_3^+NCH_2CH_2OH$, $H_2^+N(CH_2CH_2OH)_2$, $H^+N(CH_2CH_2OH)_3$, $^+N(CH_2CH_2OH)_4$, $H^+N(CH_3)(CH_2CH_2OH)_2$, $H^+N(CH_3)_2(CH_2CH_2OH)$, $^+N(CH_3)_4$, and $H^+N(C_2H_5)(CH_2CH_2OH)_2$.

4. An aqueous dyestuff preparation containing 10 to 60% by weight, based on the preparation, of a dyestuff according to claim 1.

5. A method for dyeing a cellulose-containing material comprising applying a dyestuff according to claim 1 to the cellulose-containing material.

6. A cellulose-containing material dyed with a dyestuff according to claim 1.

7. A dyestuff of formula (I)

(I)

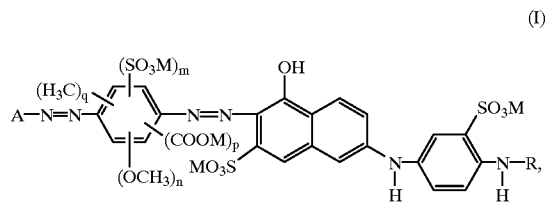

wherein

A represents a radical of the formula (II)

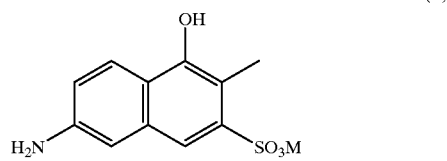

or (III)

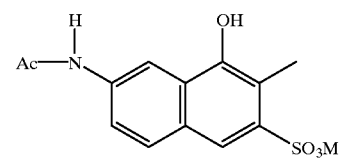

wherein Ac represents an acetyl or propionyl radical or a benzoyl radical optionally substituted by $CH_3$, $CH_3O$, or COOM, m, n, p, and q represent 0 or 1, with the proviso that the sum m+p=1, R represents a benzoyl radical optionally substituted by $CH_3$, $CH_3O$, or COOM, and M represents one or more cations, wherein more than 25 equivalent % of said cations M are ammonium radicals of the formula $^+NR_1R_2R_3R_4$ wherein $R_1$, $R_2$, $R_3$, and $R_4$ independently of one another represent hydrogen, $C_1$–$C_4$ alkyl, or $C_2$–$C_4$ hydroxyalkyl.

8. A dyestuff according to claim 7 wherein at least one of $R_1$, $R_2$, $R_3$, and $R_4$ denotes $C_2$–$C_4$ hydroxyalkyl.

9. A dyestuff according to claim 7 wherein the ammonium radical is selected from the group consisting of $H_3{}^+NCH_2CH_2OH$, $H_2{}^+N(CH_2CH_2OH)_2$, $H^+N(CH_2CH_2OH)_3$, $^+N(CH_2CH_2OH)_4$, $H^+N(CH_3)(CH_2CH_2OH)_2$, $H^+N(CH_3)_2(CH_2CH_2OH)$, $^+N(CH_3)_4$, and $H^+N(C_2H_5)(CH_2CH_2OH)_2$.

10. A dyestuff according to claim 7 wherein A represents a radical of the formula

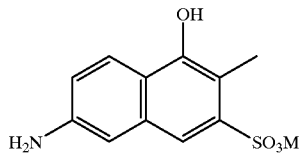

(II)

or

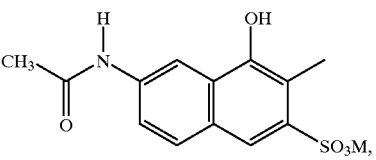

(VII)

wherein M represents one or more cations, wherein more than 25 equivalent % of said cations M are ammonium radicals of the formula $^+NR_1R_2R_3R_4$ wherein $R_1$, $R_2$, $R_3$, and $R_4$ independently of one another represent hydrogen, $C_1$–$C_4$ alkyl, or $C_2$–$C_4$ hydroxyalkyl.

11. A dyestuff according to claim 7 having the formula

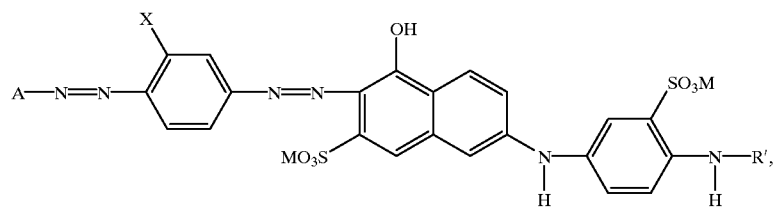

(VIII)

or wherein

A represents a radical of the formula

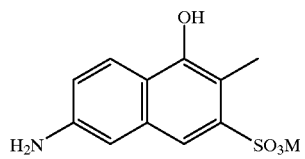

(II)

or

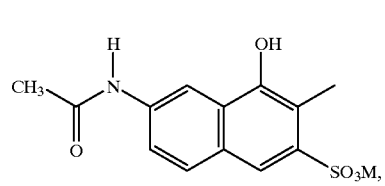

(VII)

X represents $SO_3M$ or COOM,

R' represents a benzoyl radical optionally substituted by $CH_3$, $CH_3O$, or COOM, R represents a benzoyl radical optionally substituted by $CH_3$, $CH_3O$, or COOM, and M represents one or more cations, wherein more than 25 equivalent % of said cations M are ammonium radicals of the formula $^+NR_1R_2R_3R_4$ wherein $R_1$, $R_2$, $R_3$, and $R_4$ independently of one another represent hydrogen, $C_1$–$C_4$ alkyl, or $C_2$–$C_4$ hydroxyalkyl.

12. A dyestuff according to claim 11 wherein R and R' represent

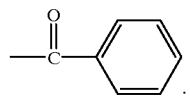

13. An aqueous dyestuff preparation containing 10 to 60% by weight, based on the preparation, of a dyestuff according to claim 7.

14. A method for dyeing a cellulose-containing material comprising applying a dyestuff according to claim 7 to the cellulose-containing material.

15. A cellulose-containing material dyed with a dyestuff according to claim 7.

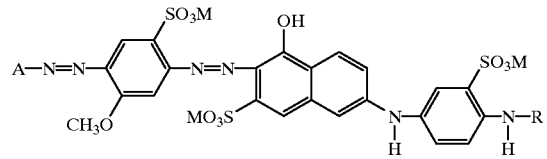

(IX)

16. A process comprising membrane filtering an aqueous solution or suspension of a dyestuff of formula (I)

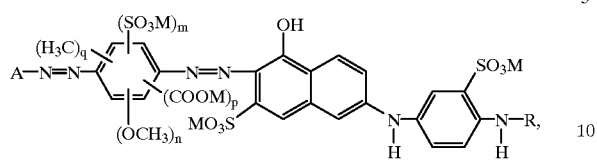
(I)

wherein

A represents a radical of the formula

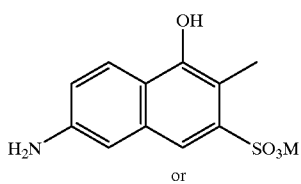
(II)

or

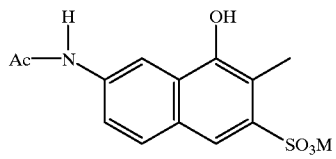
(III)

wherein Ac represents an acetyl or propionyl radical or a benzoyl radical
optionally substituted by $CH_3$, $CH_3O$, or COOM,
m, n, p, and q represent 0 or 1, with the proviso that the sum m+p=1,
R represents hydrogen or a benzoyl radical optionally substituted by $CH_3$, $CH_3O$, or COOM, with the proviso that R is not hydrogen when m is 1, n is 0, and q is 0, and
M represents $Na^+$, $Li^+$, and/or $K^+$, in the presence of an ammonium salt of the formula $^+NR_1R_2R_3R$, $An^-$ wherein $R_1$, $R_2$,
$R_3$, and $R_4$ independently represent hydrogen, $C_1$–$C_4$ alkyl, or $C_2$–$C_4$ hydroxyalkyl and
$An^-$ represents an inorganic anion.

17. A process according to claim 16 wherein at least one of $R_1$, $R_2$, $R_3$, and $R_4$ denotes $C_2$–$C_4$ hydroxyalkyl.

* * * * *